United States Patent
Verhoog et al.

(10) Patent No.: US 8,276,723 B2
(45) Date of Patent: Oct. 2, 2012

(54) LOCK-UP CLUTCH FOR HYDROKINETIC COUPLING DEVICE INCLUDING IMPROVED CONNECTION MEANS

(75) Inventors: Roel Verhoog, Gournay sur Aronde (FR); Rabah Arhab, St Brice Sous Foret (FR); Norberto Termenon, Paris (FR)

(73) Assignee: Valeo Embrayages, Amiens (FR)

( * ) Notice: Subject to any disclaimer, the term of this patent is extended or adjusted under 35 U.S.C. 154(b) by 476 days.

(21) Appl. No.: 12/500,129

(22) Filed: Jul. 9, 2009

(65) Prior Publication Data

US 2010/0025175 A1 Feb. 4, 2010

(30) Foreign Application Priority Data

Jul. 31, 2008 (FR) ........................................ 0855293

(51) Int. Cl.
*F16H 45/02* (2006.01)
(52) U.S. Cl. ..................... 192/3.29; 192/70.18
(58) Field of Classification Search ................. 192/3.29, 192/70.18, 107 C, 109 A
See application file for complete search history.

(56) References Cited

U.S. PATENT DOCUMENTS

| 5,062,517 | A | * | 11/1991 | Muchmore et al. | 192/3.29 |
|---|---|---|---|---|---|
| 6,016,897 | A | * | 1/2000 | Bacher | 192/70.27 |
| 6,085,882 | A | * | 7/2000 | Kimmig et al. | 192/70.18 |
| 6,158,560 | A | * | 12/2000 | Dehrmann | 192/3.29 |
| 6,325,191 | B1 | * | 12/2001 | Meisner et al. | 192/3.29 |
| 2006/0191761 | A1 | * | 8/2006 | Schroder | 192/3.29 |
| 2006/0201765 | A1 | * | 9/2006 | Arhab | 192/3.29 |
| 2007/0284206 | A1 | * | 12/2007 | Davis | 192/3.29 |
| 2009/0084649 | A1 | * | 4/2009 | Kombowski et al. | 192/3.29 |

FOREIGN PATENT DOCUMENTS

| DE | 198 38 445 | | 4/1999 |
|---|---|---|---|
| DE | 198 08 299 | A1 | 9/1999 |
| DE | 10 2006 048499 | A1 | 4/2008 |
| EP | 1 008 784 | A | 6/2000 |
| JP | 57 054767 | A | 4/1982 |
| JP | 58 030531 | A | 2/1983 |
| JP | 61 262262 | A | 11/1986 |
| JP | 2006 090375 | A | 4/2006 |
| WO | WO 2007/140756 | A | 12/2007 |
| WO | WO 2007140756 | A2 * | 12/2007 |

* cited by examiner

*Primary Examiner* — David D Le
*Assistant Examiner* — Lillian Nguyen
(74) *Attorney, Agent, or Firm* — Berenato & White, LLC (57) ABSTRACT

A lock-up clutch (12) for a hydrokinetic coupling device (10), wherein the clutch includes rotational coupling means between a first element (44, 46) and an adjacent element (14A, 36) consisting of elastic tongues (60) adapted to transmit torque between the elements (44, 46, 14A, 36) and to be deformed elastically in the axial direction to enable movement of the first element (44, 46) relative to the adjacent element (14A, 36) about the articulation member in the form of an annular boss (50).

11 Claims, 4 Drawing Sheets

LOCK-UP CLUTCH FOR HYDROKINETIC COUPLING DEVICE INCLUDING IMPROVED CONNECTION MEANS

This application relates to French Patent Application No. 08/55293 filed Jul. 31, 2008, of which the disclosures are incorporated herein by reference and to which priority is claimed.

BACKGROUND OF THE INVENTION

1. Field of the Invention

The present invention concerns a lock-up clutch for a hydrokinetic coupling device including improved connection means.

The invention concerns more particularly a lock-up clutch for a hydrokinetic coupling device, in particular for automobile vehicles, including, around a main axis, at least one first element having a first friction surface intended to cooperate selectively with a second friction surface of a second element, wherein articulation means, on the one hand, and sealing means, on the other hand, are respectively disposed axially between a proximal bearing face of the first element and a distal bearing face of an adjacent element, and wherein the first element and the adjacent element, which extend radially, orthogonally to the main axis, are rotationally connected by connecting means adapted to transmit torque between said elements.

2. Description of Related Art

The document DE 102006048499 A1 describes a hydrokinetic coupling device including one embodiment of such a lock-up clutch provided with associated articulation and sealing means.

In that document, the lock-up clutch includes a first element formed by a disk, called the support disk, having a first friction surface which, being part of a friction facing fastened to the disk, is intended to cooperate, in the operating position (clutch engaged), with a second friction surface of a second element.

The second friction surface, axially facing the first, is globally parallel to the radially oriented first friction surface.

In the case of a clutch of the "single-sided" type (FIGS. 1 and 2), the second element is one of the shells of the casing, an annular portion of the wall of which forms the second friction surface.

In the case of a lock-up clutch of the "two-sided" type (FIG. 3), the second element is a friction disk that is disposed axially between the first element and the shell of the casing and has two friction facings.

Accordingly, the radial face of one of the friction facings forms the second friction surface intended to cooperate with the first friction surface of the first element whereas the radial face of the other friction facing forms a third friction surface intended to cooperate with a fourth friction surface formed by an annular portion of the wall of the shell of the casing.

In each of the above types of lock-up clutch, the support disk forming the first element is rotationally connected to an adjacent element formed by a piston.

The support disk has a proximal bearing face that is axially opposite the face carrying the friction facing and extends radially, globally parallel to a facing distal bearing face of the piston.

The support disk includes articulation means that project axially from the proximal bearing face and cooperate with the distal bearing face of the piston to form an articulation adapted to allow relative movement between the support disk and the piston.

Sealing means in the form of a lip seal are arranged between the proximal face of the support disk and the distal face of the piston to provide the seal required for axial movement of the piston from its rest position (clutch disengaged) to its operating position (clutch engaged).

In the above document, the support disk forming the first element is rotationally connected to the piston forming the adjacent element by meshing connecting means. To be more precise, the support disk includes lugs that extend axially through the piston, which to this end includes complementary housings into which the driving lugs penetrate.

However, such connecting means are not entirely satisfactory, for various reasons explained hereinafter.

With such meshing rotational connecting means, the cooperation of shapes between the lugs and the housings is necessarily effected with some radial and/or axial play to retain the possibility of movement of the support disk relative to the piston via the articulation means.

Consequently, movements of the support disk relative to the piston cause high friction at the connecting means formed by the lugs and the housings, which gives rise to problems of wear.

Moreover, such meshing connecting means are particularly costly to fabricate, notably because of the operations necessary to obtain the lugs and housings, or of the treatment applied afterward, for example to increase their hardness.

SUMMARY OF THE INVENTION

A notable object of the present invention is to eliminate the drawbacks cited above and to propose a lock-up clutch including improved connecting means that are simple, reliable and of relatively low cost.

To this end, the invention proposes a lock clutch of the type described hereinabove, characterised in that the rotational connecting means consist of elastic tongues which, extending radially between the first element and the adjacent element, include at least one first junction portion joined to the first element and one second junction portion joined to the adjacent element, said tongues being adapted to be deformed elastically in the axial direction to allow movement of the first element relative to the adjacent element about the articulation means.

The elastic tongues of the invention constitute rotational connecting means that are particularly reliable as, compared in particular to the meshing connecting means of the prior art, such elastic tongues are not exposed to problems of friction and wear of a kind to affect their proper operation and that of the articulation means.

The elastic tongues advantageously have a high stiffness in the circumferential direction, i.e. in the mean radial plane in which the tongues are driven in rotation with the first element and the adjacent element about the main axis X-X, so as to transmit torque from the first element to the adjacent element.

The elastic tongues advantageously have an axial elasticity adapted to improve the operation of the articulation means, the tongues contributing to the introduction of elasticity or flexibility that facilitates "rolling" movements of the first element relative to the articulation means carried by the piston.

In the lock-up clutch of the invention, the first element, such as the disk, carrying the first friction surface is not rigidly connected to the adjacent element, such as a piston, and so these elements can be deformed independently of each other via the articulation means in such a way as to obtain cooperation of the globally coplanar friction surfaces, regardless of the oil pressure applied to the piston to clamp the friction surfaces axially.

According to other features of the invention:

the articulation means are formed by an annular boss that projects axially relative to one of the following faces: either the proximal bearing face of the first element or the distal bearing face of the adjacent element, and a top portion of which cooperates with the other of the above faces: either the proximal bearing face of the first element or the distal bearing face of the axially facing adjacent element;

the sealing means are formed by the articulation means operative between the first element and the adjacent element;

the sealing means are elastically deformable at least in the axial direction so that said sealing means form progressive action means;

each elastic tongue extends circumferentially between its ends along a rectilinear or curvilinear profile;

the elastic tongues exert an axial elastic return force, adapted in particular to ensure permanent contact between the articulation means carried by one of the following elements: said first element or said adjacent element, and the bearing face of the other of the above elements: said first element or said adjacent element;

the elastic tongues are separate from the elements that they connect rotationally and one end of each tongue forms the first junction portion fastened to the first element via first fixing means and the other end forms the second junction portion fastened to the adjacent element via second fixing means;

the elastic tongues are in one piece with the first element or with the adjacent element to which each one-piece tongue is joined by at least one junction portion;

the first junction portion of the elastic tongue and one element consisting either of said first element or said adjacent element is formed by one of the ends of the tongue that is in one piece with said element and the second junction portion is formed by the other end of the tongue which is a free end and is rotationally connected by fixing means to the other element consisting either of said adjacent element or said first element;

the first junction portion of the elastic tongue and one element consisting of said first element or said adjacent element is formed by both its circumferential ends in one piece with said element and the second junction portion of the tongue is formed by a central portion that is rotationally connected by fixing means to the other element consisting either of said adjacent element or said first element;

the fixing means of the elastic tongues, such as the first and/or the second fixing means, are rivets;

the elastic tongues are curved;

the first element is formed by a support disk and/or a friction facing and the adjacent element rotationally connected to the first element is formed by a piston or by a front shell of the casing of the device.

BRIEF DESCRIPTION OF THE DRAWINGS

Other features and advantages of the invention will become apparent on reading the following detailed description, to assist an understanding of which see the appended drawings, in which.

DETAILED DESCRIPTION OF PREFERRED EMBODIMENTS

In order to clarify the description and the claims, in a non-limiting way, the terms "front" or "back", "top" or "bottom", "external" or "internal", etc. and the orientations "axial" or "radial" refer to elements defined in the description and relative to the longitudinal, vertical and transverse directions of the trihedron (L, V, T) represented in the figures.

In the description, identical, similar or analogous elements are designated by the same reference numbers.

Figure 1:
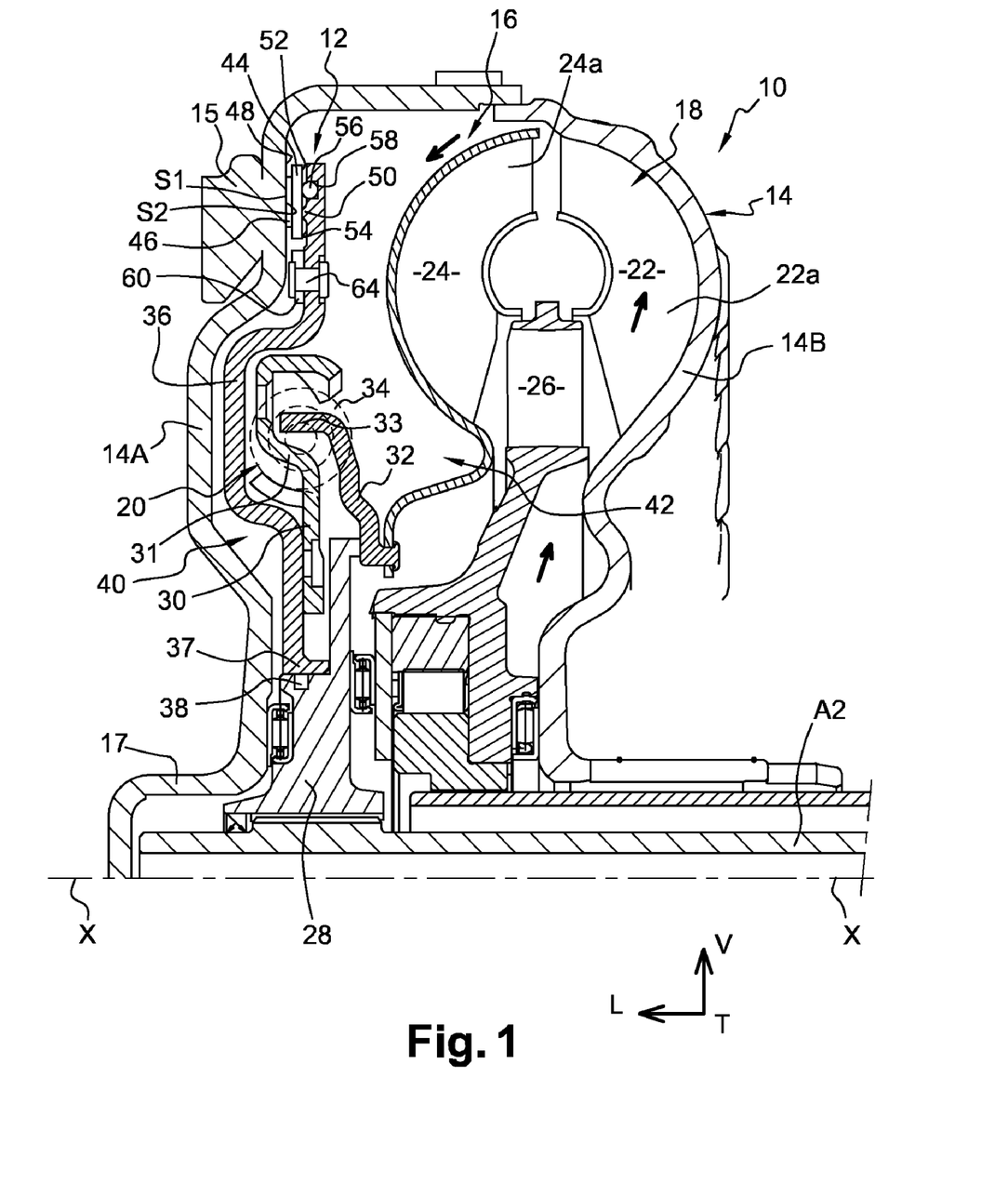
FIG. 1 is a half-view in axial section showing a hydrokinetic coupling device equipped with a lock-up clutch of the single-sided type and shows a first embodiment of rotational connecting means of the invention formed by attached elastic tongues.

By convention, the orientations "front" and "back" respectively correspond to the left-hand side and the right-hand side of FIG. 1 along the longitudinal main rotation axis X-X which determines the "axial" orientation as opposed to the "radial" orientation, which is orthogonal to it and extends vertically according to the trihedron (L, V, T).

The terms "exterior/external" and "interior/internal" are used to define the position of one element relative to another with the radial orientation corresponding to the vertical direction and therefore, with reference to the main axis X-X, an element close to the axis X-X is qualified as internal, as opposed to an external element, which is situated at the radial periphery.

FIG. 1 shows a hydrokinetic coupling device 10 including a lock-up clutch 12, in particular for an automobile vehicle.

The lock-up clutch 12 shown in FIG. 1 is a "single-sided" clutch, so called because it has only one friction facing, as opposed to other known types of lock-up clutch that include two or more friction facings, whence the associated designations "two-sided" and "multi-sided", respectively.

The "single-sided" type lock-up clutch 12 for the hydrokinetic coupling device 10 therefore constitutes only one possible and non-limiting example of application of the invention.

The hydrokinetic coupling device 10 has a main rotation axis X-X around which the various components are disposed.

The hydrokinetic coupling device 10 includes a sealed casing 14 formed of a first shell 14B at the back and a second shell 14A at the front, which are preferably assembled by welding.

The back shell 14B and the front shell 14A of the casing delimit an interior volume 16 of the device 10 containing a torque converter 18, the lock-up clutch 12 and a damper device 20.

The torque converter 18 includes a rear or impeller wheel 22, a front or turbine wheel 24 and preferably a central or reaction wheel 26.

The impeller wheel 22 includes vanes 22a that are carried by the back or first shell 14B of the casing 14, which is constrained to rotate with the front or second shell 14A of the casing 14.

The front or second shell 14A is adapted to be rotationally connected to a driving shaft (not shown), notably through coupling means including, on the one hand, connecting means 15 forming a nut and, on the other hand, a centring member 17.

The connecting means 15 are for example welded to the front radial face of the front second shell 14A and are intended to receive screws for fixing the device 10 to a flexible flange or flywheel (not shown) of an engine.

The front or second shell 14A, being constrained to rotate with the back or first shell 14B, provides the connection between the driving shaft and the impeller wheel 22 of the converter.

The turbine wheel 24 includes vanes 24a axially facing the vanes 22a of the impeller wheel 22 in order for the impeller wheel 22 to drive rotation of the turbine wheel 24 thanks to the circulation between the vanes 22a, 24a of a fluid, generally oil, contained in the volume 16 of the casing 14.

The turbine wheel 24 is rotationally connected to a driven shaft A2 that is coaxial with the main axis X-X of the device 10, said rotational connection being a connection without play provided by means of at least one intermediate part advantageously adapted to be rotationally connected to the driven shaft A2 and to the turbine wheel 24 respectively.

Said intermediate part is preferably a turbine hub 28 that rotationally connects the turbine wheel 24 to the driven shaft A2.

In the case of an automobile vehicle application, the driving shaft consists of the crankshaft of the internal combustion engine of the vehicle and the driven shaft A2 is the input shaft of the transmission of the vehicle, conventionally connected to means for changing gear.

The rotational drive between the turbine hub 28 and the driven shaft A2 is provided in the conventional way by cooperation of shapes between axial splines and grooves formed on one and/or the other, respectively.

The driven shaft A2 advantageously has at its front axial end a chamfer intended in particular to facilitate mounting of sealing means disposed radially between the turbine hub 28 and the shaft A2, axially in front of the portion in which the grooves and the splines mesh.

The hydrokinetic coupling device 10 advantageously further includes the damper device or damper 20 disposed axially between the torque converter 18 and the lock-up clutch 12. The design of such a damper 20 and its fitting are liable to vary depending on the application.

Nevertheless, and independently of its arrangement, such a damper 20 primarily includes an input element 30 and an output element 32 between which are disposed circumferentially acting spring means 34.

The input element 30 and the output element 32 of the damper 20 generally consist of parts respectively referred to as the guide washer(s) and the shell, or vice-versa.

In the embodiment represented in FIG. 1, the damper 20 includes a radially-oriented output element 32 that is provided at its exterior end with axial lugs 33 formed by bending and intended to cooperate with the circumferentially acting spring members 34 and the interior end of which is rotationally connected to the turbine wheel 24 and to the hub 28.

The output element 32 is preferably crimped to the interior end of the shell of the turbine wheel 24.

In axial section, the turbine hub 28 is globally L-shaped, comprising a radially-oriented part and an axially-oriented part.

The radially interior end of the output element 32 of the damper 20 is welded to the end of the radially-oriented part of the hub 28 so that the turbine hub 28 and the shell of the turbine wheel 24 are rotationally connected via the output element 32 of the damper 20, which is disposed axially between and fastened to each of these parts.

The circumferentially acting spring means 34 are disposed between the input elements 30 and the output element 32 of the damper and are formed by coil springs, for example, optionally pre-curved.

The input element 30 is rotationally connected to a piston 36 of the lock-up clutch 12, for example via a radially interior first portion of flat ring shape that is riveted to the piston 36.

The input element 30 includes a radially exterior second portion of globally half-toroid shape, most of which is inside a space delimited by the piston 36.

In axial section, the second portion of the input element 30 has a C-shaped profile defining a concavity open axially toward the back, in the direction of the turbine wheel 24, and forming a circumferential groove receiving the circumferentially-acting spring means 34. The spring means 34 are therefore guided circumferentially and retained axially by the input element 30.

As can be seen in FIG. 1, the second portion of the input element 30 includes openings through which the lugs 33 of the output element 32 that is connected to the shell of the turbine wheel 24 and the turbine hub 28 pass axially.

The spring members 34 are disposed between, on the one hand, the lugs 33 of the output element 32 and, on the other hand, driving lugs 31 formed in the C-shaped second portion of the input element 30 by a cutting and/or pressing process in a manner known in the art.

The lugs 33 of the output element 32 advantageously include, in the areas in contact with the spring members 34, centring and retaining studs that penetrate inside the end turns of each spring member 34.

The piston 36 of the lock-up clutch 12 is mounted to move axially between a rest position (clutch disengaged) and an operating position (clutch engaged) and is adapted to connect the front or second shell 14A of the casing 14 releasably to the driven shaft A2.

The operation of the hydrokinetic coupling device 10 includes a first phase called the "converter phase" and a second phase called the "coupling phase".

During the converter phase, the driving shaft torque is transmitted by the casing 14 to the impeller wheel 22 which drives the turbine wheel 24 by virtue of circulation of oil between the vanes 22a and 24a.

During this converter phase, the damper 20 is hardly involved at all in damping torsional vibrations or oscillations caused primarily by the acyclic nature of the engine (not shown) including the device 10.

Torsional vibrations or oscillations are filtered by the oil in the converter 18 because the engine torque is transmitted via the kinetic energy of the oil in the converter 18.

In the FIG. 1 embodiment, the torque is transmitted directly from the turbine wheel 24 to the driven shaft A2 via the damper 20 and the turbine hub 28.

During the coupling phase, an oil pressure difference between opposite sides of the piston 36 moves the piston 36 axially from the back toward the front so as to clamp axially together the friction surfaces S1, S2.

To avoid the loss of efficiency caused in particular by slippage between the impeller wheel 22 and the turbine wheel 24, the lock-up clutch 12 is generally operated after starting the vehicle and after hydraulically coupling the driving shaft and the driven shaft A2.

The piston 36 moves axially relative to the axially-oriented portion of the turbine hub 28, which extends axially in front of its radially-oriented other portion fastened to the output element 32 and to the shell of the turbine wheel 24.

The piston 36 has at its internal periphery an L-shaped first portion similar to that of the hub 28, the axially-oriented portion of which constitutes a barrel 37 that extends axially toward the front and cooperates with a sealing hub 38, such as a segment or a seal.

The sealing means 38 are disposed between the internal sliding surface of the piston 36 formed by the bush 37 and the facing surface of the hub 28, to provide the seal between a first chamber 40 called the control chamber and a second chamber 42 called the turbine chamber.

The sealing means 38 are carried by the hub 28, alternatively by the piston 36, and housed in an annular groove of the hub 28 that preferably has a chamfer at the end to facilitate mounting the sealing means 38 by nesting them in the groove.

The piston 36 includes, radially at the exterior and beyond the first portion, an intermediate second portion, here C-shaped, which substantially espouses the shape of the front or second shell 14A of the casing and defines the space housing the damper 20 and terminates in a radial rectilinear third portion.

The piston 36 is adapted to be commanded selectively to proceed to coupling, i.e. displacement of the piston 36 to its operating position in which it axially clamps at least a first friction surface S1 of a first element against an associated second friction surface S2 of a second element.

In the first embodiment, shown in FIG. 1, said first element is a support disk 44 that has a radial front face to which a friction facing 46 the front face of which forms said first friction surface S1 is attached, preferably glued.

The second element consists of the front or second shell 14A the rear radial face or wall 48 of which forms said second friction surface S2 intended to cooperate selectively with the first friction surface S1.

The lock-up clutch 12 includes articulation means 50 disposed axially between a proximal bearing face 52 of the first element formed by the support disk 44 and a distal bearing face 54 of an adjacent element formed by the piston 36.

The proximal bearing face 52 is formed by the back radial face of the support disk 44, which is axially opposite the front radial face carrying the friction facing 46, while the distal bearing face 54 is formed by the front radial face of the exterior third portion of the piston 36.

The lock-up clutch 12 further includes sealing means 56 respectively disposed axially between the proximal bearing face 52 of the support disk 44 forming the first element and the distal bearing face 54 of the piston 36 forming the adjacent element.

The sealing means 56 advantageously consists of an annular seal, for example, which, carried by the piston 36, is mounted in a groove 58 in the piston 36 and extends axially in the axial space between the piston 36 and the support disk 44 to cooperate with the proximal bearing face 52 of the disk 44.

Here, in axial section, the seal 56 has a globally-circular or O-shaped section; alternatively, the seal 56 is a lip seal having an X-shaped or Y-shaped section.

The sealing means 56 are preferably made from an elastomer material. The sealing means 56 are therefore elastically deformable, which is particularly advantageous if the support disk 44 pivots relative to the piston 36 about the articulation 50.

The sealing means 56 are liable to be compressed, in particular axially, on coupling the piston 36.

The sealing means 56 advantageously have a particular stiffness and provide a two-fold function of sealing and progressive action.

The lock-up clutch 12 preferably includes progressive action means disposed axially between the friction facing 46 and the support disk 44 or between the support disk 44 and the piston 36, i.e. between the proximal bearing face 52 and the distal bearing face 54.

The support disk 44 and the piston 36 extend radially, i.e. orthogonally to the main axis X-X.

The support disk 44 forming the first element and the piston 36 forming the adjacent element are rotationally connected via connecting means 60 adapted to transmit torque between said elements 44, 36.

According to the invention, the rotational connecting means consist of elastic tongues 60 that extend radially between the support disk 44 and the piston 36 and are adapted to be deformed elastically in the axial direction to enable relative movement about the articulation means 50 of the first element formed by the support disk 44 relative to the piston 36 forming the adjacent element.

The elastic tongues 60 extend globally in a radial (V, T) plane and axially connect the support disk 44 and the piston 36 between which the tongues 60 are arranged.

The elastic tongues 60 are preferably arranged at the internal radial periphery of the first element 44, under the friction surface S1 carried by the friction face 46.

Alternatively, the elastic tongues 60 are arranged at the external radial periphery of the first element 44 or the adjacent element 36, i.e. radially above the friction surface S1 carried by the friction facing 46, for example.

Figure 3:
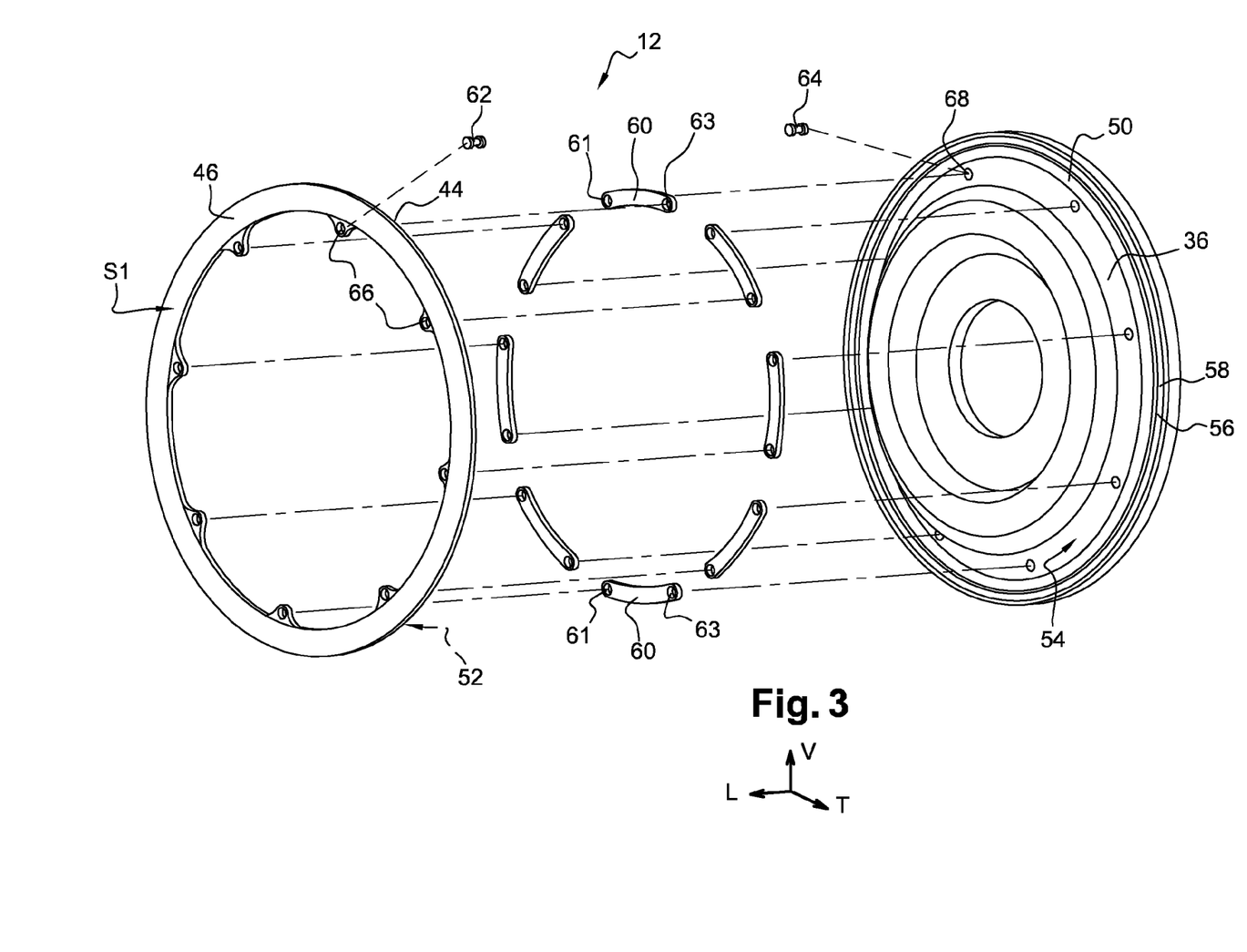
FIG. 3 is an exploded perspective view showing part of the first embodiment of the invention from FIGS. 1 and 2 above and independent elastic tongues each of which is riveted at its respective ends to the support disk and the piston.

In the first embodiment, and as shown in FIG. 3, the elastic tongues 60 are independent of the disk 44 and the piston 36 and preferably regularly distributed in the circumferential direction.

There is advantageously an even number of elastic tongues 60, for example here 8 tongues, alternatively 2, 4 or 6 tongues, which are arranged in pairs, the tongues in one pair being diametrally opposed on opposite sides of the main axis X-X.

Alternatively, there is an odd number of elastic tongues 60, for example 3 or 5 tongues, regularly spaced in the circumferential direction.

Each of the elastic tongues 60 preferably consists of an assembly of at least two tongues joined together to form a unitary assembly.

Each of the elastic tongues 60 includes at least one first junction portion connected to the first element formed by the support disk 44 and one second junction portion connected to the adjacent element formed by the piston 36.

In the first embodiment, the first and second connecting portions are the circumferential ends 61 and 63 of each tongue 60, the end 61 of the tongue 60 therefore being fixed to the support disk 44 by first fixing means 62 whereas the other end 63 is fixed to the piston 36 by second fixing means 64.

The first and second fixing means 62 and 64 are advantageously rivets.

Alternatively, the rivets 64 are of the extruded type and are produced in the piston 36, said rivets forming the second fixing means 64 of the piston 36 and the second connecting portion formed by the end 63 of each of the tongues 60.

Another alternative is for the fixing means of either or both the junction portions of each tongue 60 to consist of any other appropriate means, for example crimping or welding means.

To fix the ends 61 of the tongues 60, the support disk 44 includes lugs 66 with a central opening for the rivets 62 to pass through, extending radially inward from the internal circular edge of the disk.

The fixing lugs 66 of the tongues 60 are preferably regularly distributed in the circumferential direction.

For fixing the ends 63 of the tongues 60, the piston 36 includes axial bores 68 for the rivets 64 to pass through.

The elastic tongues 60 are advantageously curved so that the ends 61 and 63 of the tongues 60 do not lie in the same radial plane in the free state and before they are fixed.

After fixing the respective tongues 60 to the support disk 44 and the piston 36, the first junction portion fastened to the support disk 44 lies globally in a first radial plane defined by the disk 44 forming the first element and the second junction portion fastened to the piston 36 lies generally in a second radial plane which, defined by the piston 36 forming the adjacent element, is globally parallel to and offset axially relative to the first plane.

Figure 2:
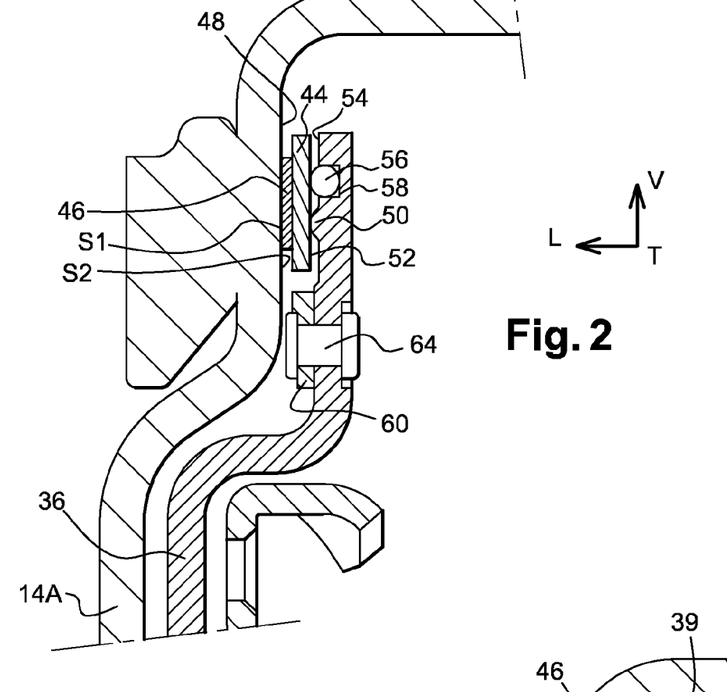
FIG. 2 is a view in axial section showing in detail a portion of the clutch from FIG. 1.

The articulation means 50 are advantageously formed by an annular boss that projects axially relative to the distal bearing face 54 of the piston 36 and a top portion of which cooperates with the proximal bearing face 52 of the support disk 44 axially facing it, said boss 50 being circumferentially continuous.

Alternatively, the articulation means 50 are fastened to the support disk 44 from the proximal bearing face 52 of which the boss 50 projects axially in the direction of the distal bearing face 54 of the piston 36 with which it cooperates.

The articulation means 50 are therefore carried by one or the other of the elements 44, 36 between which they are axially disposed.

The boss 50 is advantageously in one piece with the piston 36.

The annular boss 50 is preferably obtained by machining, in particular the top portion of the boss, to obtain great accuracy in respect of the contact surface forming the articulation.

Machining the annular boss 50 also has the advantage of accurately producing a good surface state if the boss 50 fulfils the sealing means function.

Alternatively, the articulation means 50 consists of a member, such as a ring, fixed to the support disk 44 or the piston 36.

In an alternative that is not shown, the sealing means 56 operative between the first element 44 and the adjacent element 36 consist of the annular boss forming the articulation means 50 against the top portion of which the proximal bearing face 52 of the support disk 44 is urged by the elastic tongues 60.

The elastic tongues 60 advantageously exert an axial elastic return force between the disk 44 and the piston 36.

Each elastic tongue 60 is preferably formed by at least one tongue or group of tongues and each elastic tongue 60 preferably extends circumferentially between its ends 61, 63 with a globally curvilinear profile.

Alternatively, each elastic tongue 60 extends circumferentially between its ends 61, 63 with a globally rectilinear or straight profile.

Each straight tongue 60 preferably extends tangentially relative to the circular internal edge of the support disk 44.

Of course, the first embodiment of the invention, in which the first element is formed by the support disk 44 and the adjacent element is formed by the piston 36, merely constitutes one non-limiting example of the invention.

In an alternative that is not shown, the lock-up clutch 12 being of the single-sided type, the first element is formed by a support disk 44 that is rotationally connected by elastic tongues 60 to an adjacent element formed by the front or second shell 14A of the casing.

In such a variant, the distal bearing face 54 is the wall 48 of the front second shell 14A of the casing and the first friction surface S1 is intended to cooperate with a second friction surface S2 that is the front radial face of the piston 36, which consequently constitutes the second element.

At least the first friction surface S1 preferably belongs to a friction facing 46 that is fixed, for example glued, to the back radial face of the support disk 44, the front radial face of which forms the proximal bearing face 52.

Depending on the application, the friction facing 46 includes grooves the profile of which can vary and which in particular improve cooling in the vicinity of the second friction surface S2 and enable operation with controlled slippage.

Alternatively, the friction facing 46 is dispensed with and the first friction surface S1 is formed directly by that of the radial faces of the support disk 44 that does not form the proximal bearing face 52.

Figure 4:
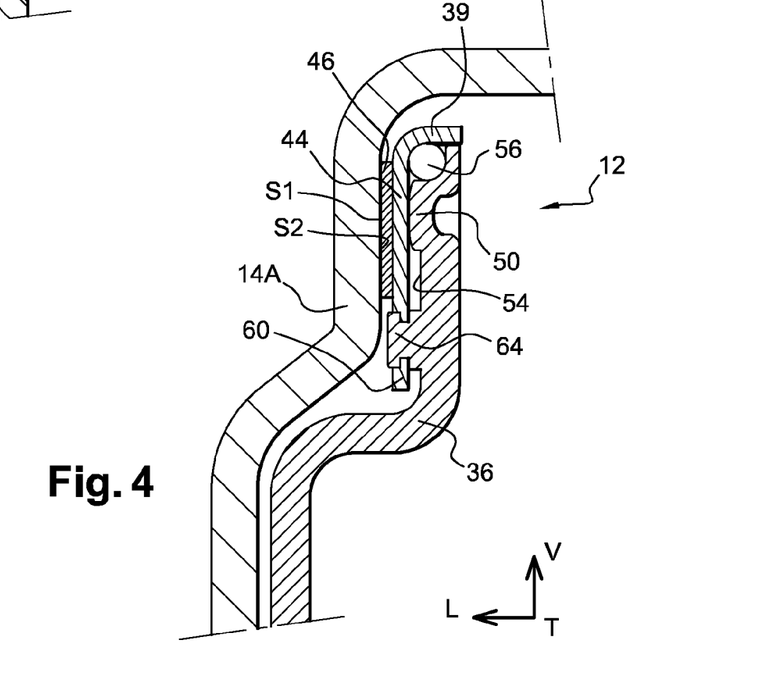
FIG. 4 is a view in axial section analogous to FIG. 2 and showing in detail a second embodiment of a lock-up clutch of the invention.

A second embodiment, shown in FIG. 4, is described next and compared to the first embodiment.

In this second embodiment, the articulation means 50 are advantageously produced in a particularly simple and economical manner by pressing the piston 36.

The articulation means are formed by an annular boss 50 that is circumferentially continuous and fastened to the distal face 54 of the piston 36.

Alternatively, if the clutch 12 includes separate sealing means 56 and articulation means 50, the boss 50 is circumferentially discontinuous, for example formed by circular arc portions.

The support disk 44 advantageously includes a step 39 which is produced by bending its exterior radial edge, for example, and extends axially toward the back and defines with the piston 36 a cage in which the sealing means 56 are mounted.

The sealing means 56, such as a seal, are thus housed to cooperate, on the one hand, radially between the lower axial face of the skirt 39 of the disk 44 and the annular boss 50 and, on the other hand, axially with the proximal and distal bearing faces 52, 54 of the support disk 44 and the piston 36, respectively.

Such sealing means 56 advantageously constitute progressive action means adapted to be elastically deformed in the axial and/or radial direction.

The deformation of the sealing means 56, in particular in torsion, contributes to improving the operation of the articulation means 50 by encouraging "rolling" movement between the support disk 44 and the piston 36.

The elastic tongues 60 forming the rotational connecting means of the support disk 44 and the piston 36 are preferably made in one piece with the support disk 44, for example as in either of the embodiments shown in FIGS. 5 and 6 described hereinafter.

Alternatively, the elastic tongues 60 forming the rotational connecting means of the support disk 44 and the piston 36 are independent and analogous to those described for the first embodiment.

The rivets 64 are advantageously of the extruded type and produced in the piston 36, said rivets forming the second means 64 for fixing the piston 36 and the second connecting portion formed by the end 63 of each of the tongues 60.

Figure 5:
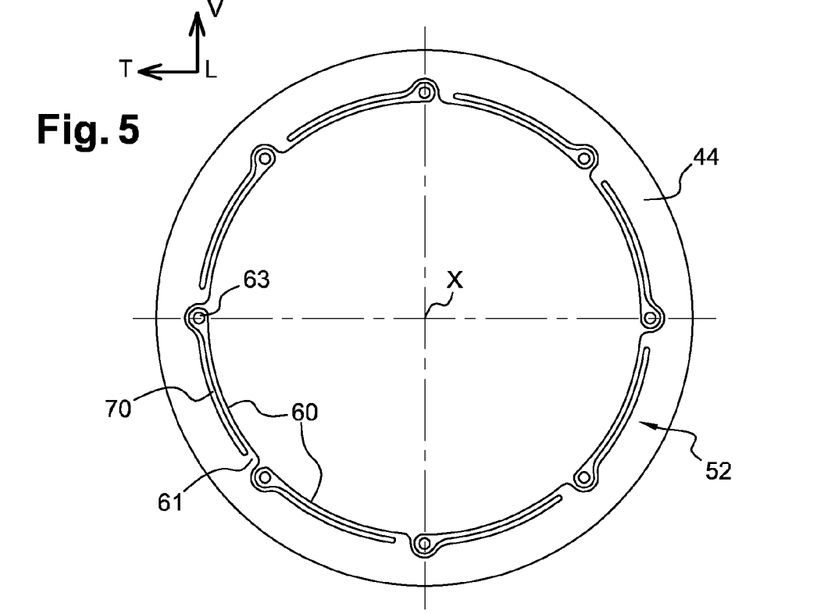
FIG. 5 is a front view showing in detail a support disk of a different embodiment in which the elastic tongues are made in one piece with the support disk, each of the tongues being joined at one of its circumferential ends to the disk and riveted at its other end, which is a free end, to the piston.

A different embodiment of the elastic tongues of the invention is described next, as shown in FIG. 5 in particular.

This variant is described hereinafter in comparison with the first and second embodiments in which the elastic tongues 60 are separate and independent of the elements formed by the support disk 44 and the piston 36.

The elastic tongues 60 are advantageously produced in one piece with the first element or with the adjacent element, to which each one-piece tongue 60 is joined by at least one junction portion.

The elastic tongues 60 are preferably made in one piece with the support disk 44, to which each tongue 60 is joined by a junction portion formed by one of its circumferential ends 61.

The second junction portion is advantageously formed by the other end 63 of the tongue 60 which is a free end adapted to be rotationally connected via fixing means to the other of said elements near the piston 36 forming the adjacent element.

The fixing means consist of any appropriate means, preferably rivets, extruded or otherwise.

The elastic tongues 60 are advantageously produced by cutting in the internal radial periphery of the support disk 44 a slot 70 extending circumferentially between each tongue 60 and the disk 44 to enable it to move axially.

Figure 6:
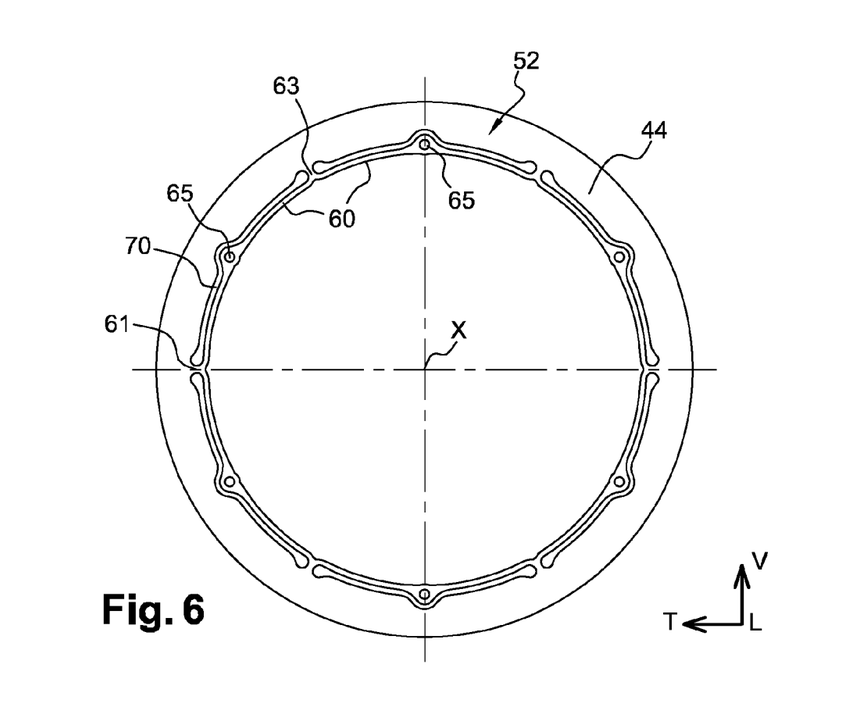
FIG. 6 is a front view showing in detail a support disk of a further embodiment in which the elastic tongues are made in one piece with the support disk, to which each tongue is joined at each of its circumferential ends, a central portion of the tongue being riveted to the piston.

FIG. 6 shows another embodiment of the elastic tongues 60 in which the elastic tongues 60 are produced in one piece with the first element or the adjacent element, as in the previous embodiment.

The elastic tongues 60 are preferably made in one piece with the support disk 44 forming the first element, advantageously by a cutting process.

In this variant, the first junction portion of each elastic tongue 60 with the support disk 44 is formed by its circumferential ends 61 and 63.

The second junction portion of each elastic tongue 60 with the piston 36 is formed by a central portion 65 of the tongue 60, preferably globally equidistant from the ends 61 and 63 forming the first junction portion with the support disk 44.

The central portion 65 of each tongue 60 is preferably rotationally connected by fixing means to the piston 36 forming the adjacent element.

The fixing means of the central portion 65 of each tongue 60 are advantageously, as in the first and second embodiments, rivets 64, extruded or otherwise.

In an embodiment that is not shown, the elastic tongues 60 are in one piece with a friction facing 46 which, the support disk 44 being dispensed with, forms the first element including the first friction surface S1 and the proximal bearing face 52.

Such a friction facing 46 forming the first element is rotationally connected by one-piece tongues 60 to an adjacent element formed by the piston 36, or alternatively by the front or second shell 14A of the casing.

The friction facing 46 made in one piece with the elastic tongues 60 is preferably a woven facing, in particular one woven from carbon fibres.

The operation of the lock-up clutch 12 of the device 10 is more particularly described next, in relation to the advantages of the elastic tongues 60 of the invention.

In the following description, and as in the above first and second embodiments, the elastic tongues 60 provide the rotational connection of the friction disk 44 forming said first element and the piston 36 forming said adjacent element.

In operation, the coupling of the driving shaft and the driven shaft A2 is first established during the converter phase via the impeller wheel 22 and the turbine wheel 24 of the inverter 18 and thereafter in the coupling phase by the lock-up clutch 12, which is activated so that the driving shaft, which is connected to the impeller wheel 22 by the casing 14, is coupled to the driven shaft A2 by the damper 20 and the turbine hub 28 connecting it to the turbine wheel 24.

The driven shaft A2 includes a central axial bore open at the free front end of said shaft. This bore communicates with the control chamber 40, which is delimited axially by the wall 56 of the casing and the piston 36 and fed with oil under pressure by a hydraulic circuit connected to said bore.

The piston 36 of the lock-up clutch 12 is controlled by varying the pressure on either side of the piston 36, i.e. between the control chamber 40 and the turbine chamber 42, the piston 36 being moved axially toward the front, from its rest position to its operating position, so as to couple the piston 36 carrying the first friction surface S1 and the wall 56 of the casing 14 forming the second friction surface S2.

When the piston 36, moved toward the front by the oil pressure, clamps the friction facing 46 against the wall 48, torque is transmitted through the damper 20 from the wall 48 of the front or second shell 14A of the casing 14, which is connected to the driving shaft, to the turbine wheel 24, which is connected to the driven shaft A2.

It is precisely when the first and second friction surfaces S1 and S2 are brought into contact with each other to achieve coupling (clutch engaged) that certain phenomena occur that are deleterious as much to optimum operation of the lock-up clutch as to a comfortable and pleasant driving experience.

The main problem is linked to the fact that the piston carrying one of the friction surfaces is deformed differently according to the pressure that is applied to it, which is the reason why the friction surfaces are not coplanar over all pressures in the range of operation.

This problem is known as "coning" and is reflected in varying contact pressures between the friction surfaces S1 and S2, and in particular the first friction surface S1 of the friction facing 46 carried by the piston 44 does not cooperate with the second friction surface S2 through plane-to-plane contact.

If the pressures are between 0.5 and 2.5 bar, for example, the pressure is not evenly distributed in the radial direction over all of the friction facing, being applied for the most part, or even exclusively, to the internal radial periphery of the friction facing.

The pressure is not uniformly distributed in the radial direction and transmission of torque by friction is effected via the radially internal portion of the friction facing and not by the whole of the friction surface.

At such pressures, the friction facing 46 and the piston 36 tend to tilt obliquely backwards, i.e. the radially external portion of the friction facing 46 is axially behind the radially internal portion that essentially cooperates with the second friction surface S2.

Conversely, if the pressures applied are the maximum pressures, for example of the order of 6.5 bar, it is again found that the radial distribution of the pressure is not uniform and that a higher pressure is exerted at the external radial periphery of the friction facing and no longer at the internal periphery as before.

The friction facing 46 and the piston 36 therefore tend to tilt obliquely toward the front, i.e. the radially external portion of the friction facing 46 is axially in front of the radially internal portion that essentially cooperates with the second friction surface S2.

Consequently, over the whole of the range of operation, the friction surfaces S1 and S2 are only substantially coplanar except for a limited number of pressure values from the range of operation, for example 5.5 bar, generally for a given pressure at which the maximum torque is transmitted.

These contact area variations and the non-uniform distribution of the pressure over the friction surfaces S1, S2 cause local heating and deterioration, in particular irregular and high wear of the friction surfaces.

These phenomena of heating and premature wear affect in particular the correct operation and the longevity of the friction facing 46.

Such phenomena are often the source of problems of snatching or vibration of the clutch 12 on engaging the clutch (coupling) and releasing the clutch depending on the engine speed or to change gear.

Moreover, these phenomena often cause deterioration of the hydraulic fluid contained in the casing.

Thus friction irregularities generally affect proper control of the lock-up clutch and lead to the occurrence of torsional vibrations that are often the source of acoustic or vibratory discomfort.

Thanks to the combination of the articulation means 50 and the elastic tongues 60, the support disk 44 forming the first element is free to move relative to the adjacent element, for example the piston 36, independently of the latter's position.

The friction facing 46 carried by the disk 44 is therefore advantageously able to pivot on the annular boss 50 and thus, in operation, to compensate the phenomena affecting frictional cooperation of the friction surfaces S1 and S2 so that they are substantially coplanar regardless of the pressure.

The lock-up clutch 12 of the device 10 advantageously includes progressive action means which are elastically deformable in at least the axial direction and are formed by the sealing means 56, such as an elastomer material seal.

Progressive action in particular reduces snatching when the friction surfaces come into contact with each other, i.e. on coupling of the friction facing 46 to the wall 48 of the shell 14A of the casing.

The progressive action means therefore contribute further to improving the radial distribution of the pressure over the friction surfaces S1, S2 so that it is optimized and uniform.

Of course, the invention is in no way limited to a single-sided lock-up clutch, and can be applied to a two-sided lock-up clutch, for example.

In the case of a two-sided lock-up clutch (not shown), the first element is formed by a support disk that is rotationally connected to an adjacent element formed by the piston 36 or alternatively the front or second shell 14A of the casing.

The second element consists of a friction disk disposed axially between a first element formed by a support disk 44 and the front or second shell 14A of the casing when the adjacent element is formed by the piston 36, said friction disk including two friction facings 46.

Accordingly, the radial face of one of the back friction facings 46 forms the second friction surface S2 intended to cooperate with the first friction surface S1 of the first element 44 while the radial face of the other of the front friction facings 46 forms a third friction surface intended to cooperate with a fourth friction surface formed by an annular portion of the wall 48 of the front or second shell 14A of the casing.

The support disk 44 has a proximal bearing face 52 that is axially opposite the radial face cooperating with the friction facing 46 of the friction disk and extends radially, globally parallel to a facing distal bearing face 54 of the piston 36.

In the aforementioned embodiment of a two-sided lock-up clutch in which the adjacent element is formed by the front or second shell 14A of the casing, the friction disk forming the second element and preferably including two friction facings 46 is disposed axially between a first element formed by a support disk 44 and the piston 36 when the adjacent element is formed by the front or second shell 14A of the casing.

The radial face of one of the back friction facings 46 forms the second friction surface S2 intended to cooperate with the first friction surface S1 of the first element 44 and the radial face of the other of the front friction facings 46 forms a third friction surface intended to cooperate with a fourth friction surface formed by an annular portion of the piston 36.

The support disk 44 has a proximal bearing face 52 axially opposite the radial face cooperating with one of the friction facings 46 of the friction disk and extending radially, globally parallel to a facing distal bearing face 54 formed by the wall 48 of the front or second shell 14A of the casing.

In a different embodiment, the two-sided lock-up clutch 12 includes two "first elements", namely a first support disk rotationally connected by the elastic tongues 60 to the piston 36 and a second support disk rotationally connected to the wall 48 of the front or second shell 14A of the casing 14.

Axial articulation means 50 are then disposed, on the one hand, between the proximal bearing face of the first support disk 44 and the piston 36 and, on the other hand, between the proximal bearing face of the second disk and the wall 48, so that the first friction surface and the fourth friction surface are carried by articulated support disks.

While the foregoing invention has been shown and described with reference to preferred embodiments, it will be understood that various changes in form and detail may be made therein without departing from the spirit and scope of the claimed invention.

The invention claimed is:

1. A lock-up clutch (12) for a hydrokinetic coupling device (10), for automobile vehicles, comprising:
   a main axis (X-X);
   at least one first element (44, 46) mounted around the main axis (X-X) and having a first friction surface (S1);
   a second element (14A, 36) mounted around the main axis (X-X) and having a second friction surface (S2), the first friction surface (S1) intended to cooperate selectively with the second friction surface (S2) of the second element (14A, 36);
   an adjacent element (14A, 36) mounted around the main axis (X-X); and
   articulation means (50) and sealing means (56) both disposed axially between a proximal bearing face (52) of the first element (44, 46) and a distal bearing face (54) of the adjacent element (14A, 36);
   the first element (44, 46) and the adjacent element (14A, 36) extend radially, orthogonally to the main axis (X-X) and rotationally connected by connecting means (60) adapted to transmit torque between the first and adjacent elements (44,46, 14A, 36);
   the rotational connecting means including a plurality of elastic tongues (60) extending radially between the first element (44, 46) and the adjacent element (14A, 36), and at least one first junction portion joined to the first element (44, 46) and one second junction portion joined to the adjacent element (14A, 36);
   the tongues (60) being adapted to be deformed elastically in the axial direction to allow movement of the first element (44, 46) relative to the adjacent element (14A, 36) about the articulation means (50).

2. The lock-up clutch according to claim 1, wherein the articulation means (50) are formed by an annular boss that projects axially relative to one of the following faces: either the proximal bearing face (52) of the first element (44, 46) or the distal bearing face (54) of the adjacent element (14A, 36) and a top portion of which cooperates with the other of the above faces: either the axially facing distal bearing face (54) of the adjacent element (14A, 36) or the proximal bearing face (52) of the first element (44, 46).

3. The lock-up clutch according to claim 2, wherein the sealing means (56) are formed by the articulation means (50) operative between the first element (44, 46) and the adjacent element (14A, 36).

4. The lock-up clutch according to claim 1, wherein the sealing means (56) are elastically deformable at least in the axial direction so that said sealing means (56) form progressive action means.

5. The lock-up clutch according to claim 1, wherein each elastic tongue (60) extends circumferentially between its ends (61, 63) along a rectilinear or curvilinear profile.

6. The lock-up clutch according to claim 1, wherein the elastic tongues (60) exert an axial elastic return force to ensure permanent contact between the articulation means (50) carried by one of the following elements: the first element (44, 46) or the adjacent element (14A, 36), and the bearing face (52, 54) of the other of the above elements: the first element (44, 46) or the adjacent element (14A, 36).

7. The lock-up clutch according claim 1, wherein the elastic tongues (60) are separate from the first and adjacent elements (44, 46) that they connect rotationally; and wherein one end (61) of the ends (61, 63) of each tongue (60) forms the first junction portion fastened to the first element (44, 46) via first fixing means (62) and the other end (63) of the ends (61, 63) forms the second junction portion fastened to the adjacent element (14A, 36) via second fixing means (64).

8. The lock-up clutch according to claim 1, wherein the elastic tongues (60) are in one piece with the first element (44, 46) or with the adjacent element (14A, 36) to which each one-piece tongue (60) is joined by at least one junction portion.

9. The lock-up clutch according to claim 1, wherein the elastic tongues (60) are curved.

10. The lock-up clutch according to claim 1, wherein the first element is formed by a support disk (44) and/or a friction facing (46); and wherein the adjacent element rotationally connected to the first element (44, 46) is formed by a piston (36) or by a front shell (14A) of the casing (14) of the device (10).

11. The lock-up clutch according to claim 1, wherein the first element is in the form of a support disk and a friction facing attached to a radial front face of the support disk so that a front face of the friction facing forms the first friction surface.

* * * * *